May 28, 1957  B. D. MOORE  2,793,379
CAR WASHER

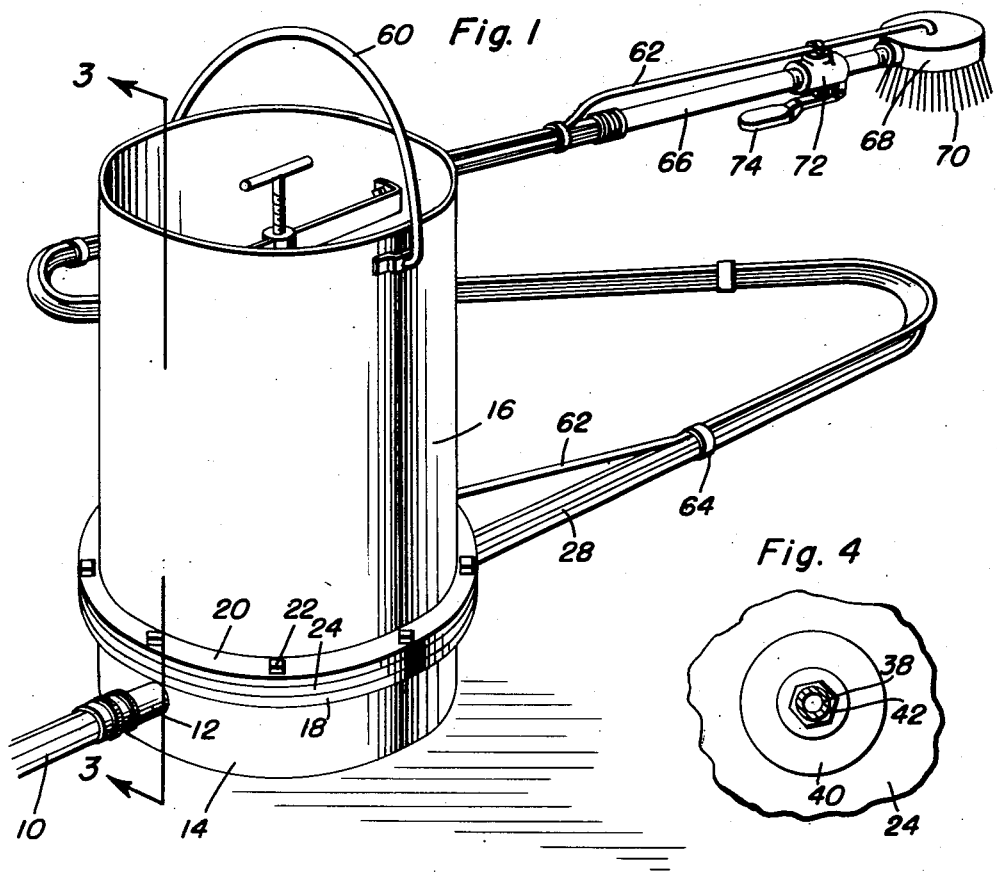
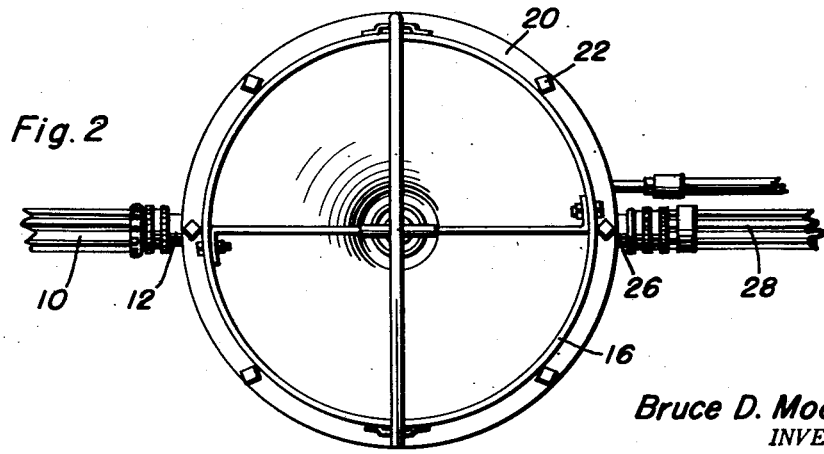

Filed Feb. 25, 1953  2 Sheets-Sheet 2

Bruce D. Moore
INVENTOR.

united states patent office 2,793,379
Patented May 28, 1957

2,793,379

CAR WASHER

Bruce D. Moore, Little Rock, Ark.

Application February 25, 1953, Serial No. 338,852

1 Claim. (Cl. 15—129)

This invention relates to a car washer which is especially adaptable for washing and cleaning automobiles and which is capable of various other household uses such as window washing and the like.

The primary object of this invention resides in the provision of a car washer that will enable an automobile to be washed with a minimum of effort and with a greatly reduced expenditure of time.

The construction of this invention features means for supplying a cleaning agent under pressure when such is desired and for subsequently or alternatively supplying water for rinsing the car after it has been thoroughly scrubbed with the cleaning agent.

Still further objects of the invention reside in the provision of a car washer that is strong and durable, simple in construction and manufacture, capable of being readily produced at a relatively low cost, and which is very easy to operate.

These, together with the various ancillary objects and features of the invention which will become apparent as the following description proceeds, are attained by this car washer, preferred embodiments of which have been illustrated in the accompanying drawings, by way of example only, wherein:

Figure 1 is a perspective view of the car washer comprising the present invention;

Figure 2 is a top plan view of this device;

Figure 4 is a horizontal sectional detail view as taken along the plane of line 4—4 in Figure 3; and, Figure 5 is a sectional detail view of a modified form of the invention.

Figure 3:
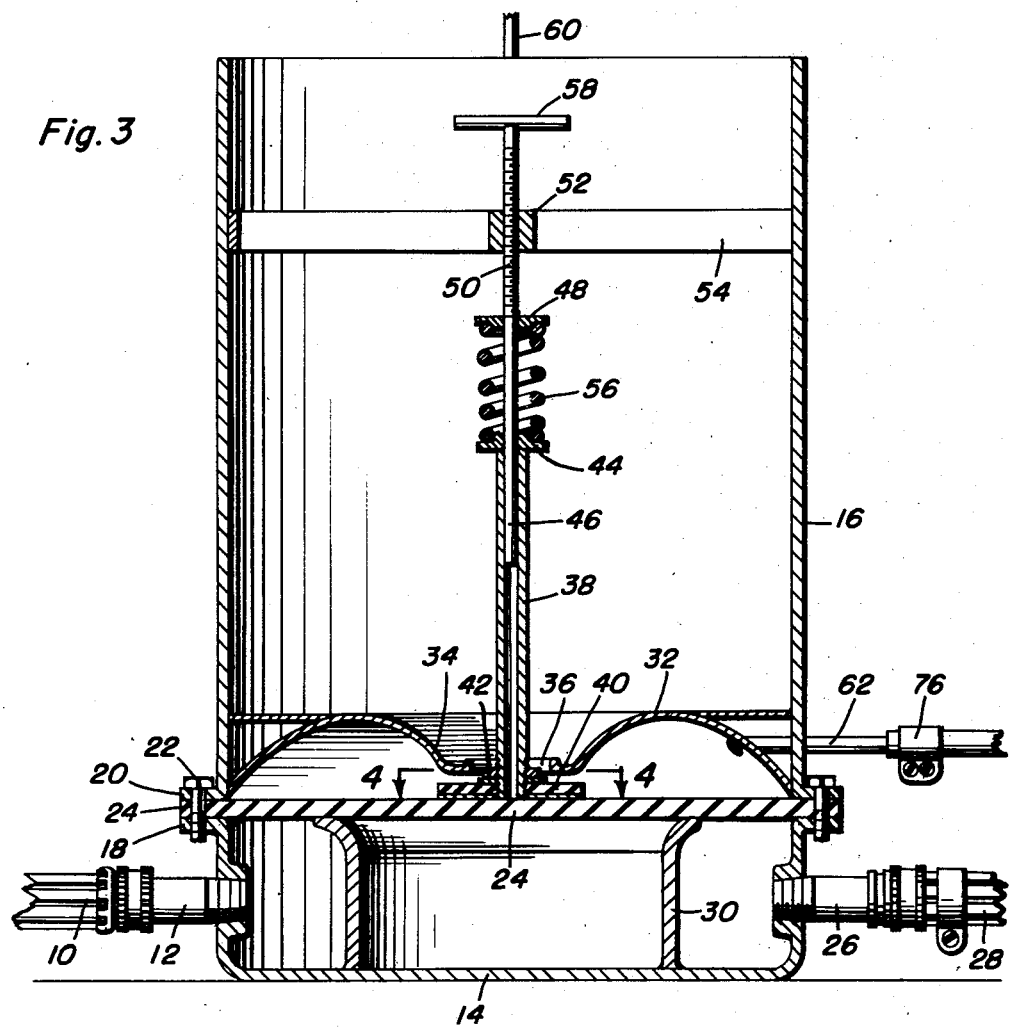
Figure 3 is a vertical sectional view as taken along the plane of line 3—3 in Figure 1.

With continuing reference to the accompanying drawings wherein like reference numerals designate similar parts throughout the various view, reference numeral 10 generally designates a conventional garden hose which is attached to a suitable water tap at one end and which is threadedly engaged about an inlet nipple 12 of the lower section 14 of a container including an upper section 16. It is to be noted that the lower section 14 is provided with a flange 18 at its upper edge and that the upper section 16 is provided with a flange 20 at its lower edge, the flange 20 being bolted as at 22 to the flange 18 with the edge portions of a diaphragm 24 clamped therebetween.

The lower section 14 is dish-shaped in configuration and has an outlet nipple 26 threadedly engaged in the side thereof which is connected to a discharge conduit or hose 28. Within the lower section 14 there is a cylindrical member 30 which acts as a limit stop for the lowermost position of the diaphragm 24 and further acts as a diaphragm recess permitting the more instantaneous build up of fluid pressure within the annular space between the cylindrical member 30 and the side walls of the section 14.

There is attached to the inner side walls of the upper container 16 a partition wall 32 provided with a downwardly extending center portion 34 provided with a central aperture 36 therethrough. Extending through the central aperture 36 is a tube 38 which has attached to the lower end thereof a resilient washer 40 which is preferably bonded to the diaphragm 24 and held in place by nut 42. The uppermost edge of the tube 38 has a pressure plate 44 secured thereto. Extending into the tubular member 38 is a rod 46 having a pressure plate 48 secured thereto medial the ends thereof. The rod 46 has a threaded upper end portion 50 threadedly engaged within a bracket 52 secured by straps 54 to the inner side walls of the upper section 16 of the container. Coaxial with the rod 46 and biasing the pressure plate 44 and 48 is a coil spring 56. A handle 58 is provided at the upper end of the rod 46 in order that the rod 46 may be moved upwardly or downwardly with respect to the bracket 52 and hence a greater or lesser amount of force may be applied on the diaphragm 24 by means of the spring 56 urging the tube 38 downwardly. A carrying handle 60 is attached to the side walls of the upper section 16 for carrying the entire device from one location to another.

There is provided a detergent conduit 62 which extends through the wall of the upper section 16 and through the partition 32 to open into the space between the diaphragm 24 and the partition 32. This conduit 62 is joined by suitable collars 64 so as to enable the conduit 62 to run co-extensive with the conduit 28. At the free end of the conduit 28 there is provided a connector 66 which is attached to the brush block 68 of a brush 70. The detergent conduit 62 is also attached to the brush block 68. A valve 72 is provided for controlling the flow of fluid through the connector 66 and is operated by means of a handle 74.

With the washer connected to the garden hose 10 it is merely necessary to turn the water on to a desired flow and inserting the brush head 68 into the upper section 16, permit at least two quarts of water to flow through the brush head 68 into the upper section 16 which is of approximately a five gallon capacity. Then, to discharge the detergent conduit 62 through connection 76 and the brush head 68 the adjusting handle 58 may be turned slowly until water runs from this detergent conduit. Then, a cleaning solution of any suitable soap or detergent is placed within the container. Further, any suitable amount of water may be added to fill the container. By closing the valve 72 using handle 74 flow of fluid will increase the pressure in the lower section 14 which will first close the aperture 36 and then by pumping effect from reduction in the volume of the chamber formed between the diaphragm 24 and the partition 32, the diaphragm 24 will force the cleaning solution through the detergent conduit 62 and then through the brush 70. Then, the automobile may be suitably scrubbed until it is desired to rinse that particular spot. Then, after releasing the handle 74, the rinsing water will flow from the head 70.

Figure 5:
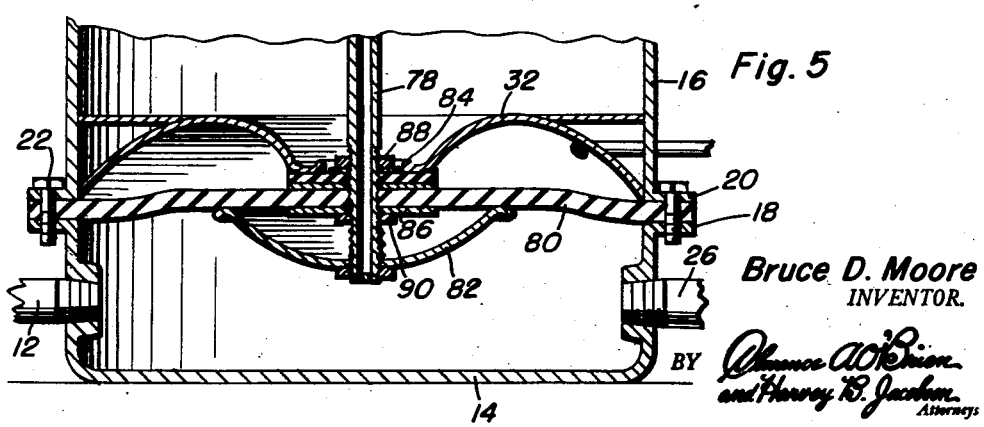

Referring to the embodiment of the invention as is shown in Figure 5, it will be seen that herein all of the parts are identical with the exception of the fact that in this form of the invention the tube 78 extends completely through the diaphragm 80 and has attached to its lower end a diaphragm cup 82 for limiting the lowermost position of the diaphragm 80. Suitable washers 84 and 86 are held in position by nuts 88 and 90 which are threadedly engaged on the tube 78. It is to be noted that while in Figure 4 the device is shown with the valve 72 open, in Figure 5 the device is shown with the valve 72 closed.

Since from the foregoing, the construction and advantages of this car washer are readily apparent, further description is believed to be unnecessary.

However, since numerous modifications will readily occur to those skilled in the art after a consideration of the foregoing specification and accompanying drawings, it is not intended to limit the invention to the precise embodiments shown and described, but all suitable modifications and equivalents may be readily resorted to as desired.

What is claimed as new is as follows:

A car washer comprising a container, a flexible diaphragm dividing said container into an upper section and a lower section, a horizontally disposed partition wall secured to said upper section above said diaphragm, a central aperture through said partition wall, resilient means biasing said diaphragm away from said partition wall, said diaphragm being adapted to close said aperture, said lower section including a fixed cylindrical member limiting the lowermost position of said diaphragm, an inlet conduit opening into said lower section, a discharge conduit having one end in communication with said lower section and having a brush head at its other end, a valve in said discharge conduit controlling flow through said discharge conduit and said brush head, and another conduit extending to said brush head communicating with the space between said partition wall and said diaphragm, said resilient means including a tube extending through said aperture and secured to said diaphragm, a bracket secured to said upper section, a threaded rod threadedly engaged in said bracket extending into said tube, and spring means biasing said tube and said threaded rod, said tube having a lower pressure plate secured thereto, said rod having an upper pressure plate secured thereto, said spring means including a coil spring about said rod engaging said upper pressure plate and said lower pressure plate.

References Cited in the file of this patent

UNITED STATES PATENTS

| | | |
|---|---|---|
| 1,595,809 | Nichols | Aug. 10, 1926 |
| 2,150,460 | Riches | Mar. 14, 1939 |
| 2,508,958 | Manville | May 23, 1950 |
| 2,664,674 | Niesemann | Jan. 5, 1954 |